UNITED STATES PATENT OFFICE.

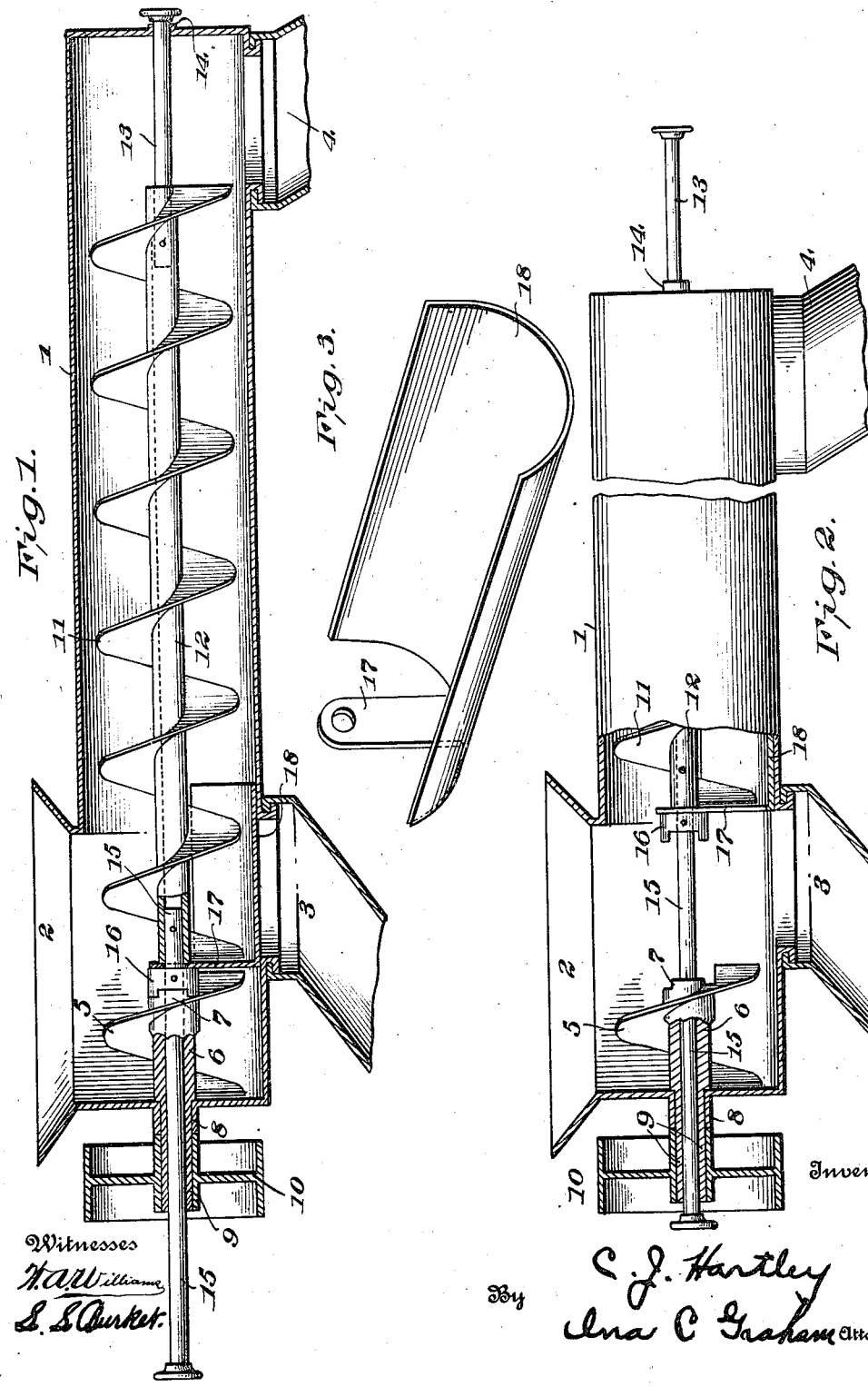

CHARLES J. HARTLEY, OF DECATUR, ILLINOIS.

GRAIN-CONVEYER.

961,958.  Specification of Letters Patent. Patented June 21, 1910.

Application filed October 9, 1909. Serial No. 521,926.

*To all whom it may concern:*

Be it known that I, CHARLES J. HARTLEY, a citizen of the United States, residing at Decatur, Macon county, Illinois, have invented certain new and useful Improvements in Grain-Conveyers; and I do hereby declare the following to be a full, clear, and exact description of the invention, such as will enable others skilled in the art to which it appertains to make and use the same.

This invention relates to certain improvements in conveyers for grain and the like; and the objects and nature of my invention will be readily understood by those skilled in the art in the light of the following description of the accompanying drawings illustrating what I now consider my preferred embodiment from among other forms, and arrangements within the spirit and scope of my invention.

An object of the invention is to simplify mechanism for handling grain, or other material, and delivering the same as desired alternately at different points, and to reduce the number of working parts to a minimum.

A further object of the invention is to provide certain improvements in arrangements of parts and combinations of elements whereby an improved and highly efficient grain conveyer will be produced.

The invention consists in certain novel features in construction and in combinations and arrangements as more fully and particularly set forth hereinafter.

Referring to the accompanying drawings: Figure 1, is a longitudinal section, the parts being adjusted to deliver the grain at the far or right hand end of the conveyer. Fig. 2, is a side elevation, parts being broken away, the elements being adjusted to deliver the grain at the near or left hand end of the conveyer. Fig. 3 is a detail view of the shut-off valve.

In the drawings, 1, is a horizontally elongated tubular casing for a screw or auger conveyer. This casing is provided with a top receiving hopper 2, opening thereinto and arranged at one end thereof, and with a bottom discharge opening or chute 3, at its near end below the hopper, and with another botom discharge opening or chute 4, at its opposite or far end. The bottom discharge opening 3, is removed a distance from the adjacent end wall of the casing thereby having what might be termed a pocket below the hopper and between said end wall and adjacent bottom opening 3. To move the grain from this pocket and longitudinally within the casing and toward the opposite end thereof, I provide a screw conveyer or auger section 5, longitudinally occupying the casing from opening 3, to said adjacent end wall. The spiral blade of the screw or auger conveyer section is rigid with its longitudinal hollow shaft 6, at its inner free end notched or otherwise formed to constitute a clutch member 7, and reduced and fitted at its outer end 9, to rotate in the journal box 8, in the end wall of the casing, and elongated to extend outwardly beyond said journal box to rigidly receive the exterior screw conveyer actuating pulley or gear 10. The screw section 5, is held against undue longitudinal movement within the casing by the hub of the pulley 10, engaging the outer end of the journal box 8, and by the intermediate shoulder of the screw shaft engaging the inner end of said journal box.

11, is a rotary spiral, screw or auger conveyer section arranged longitudinally within the casing and occupying the remainder of the casing from the screw section 5, to the far end discharge 4, and designed to coöperate with screw section 5, in forcing the grain from the hopper to the far end discharge 4. This screw section 11, is rotated or actuated through the medium of screw section 5, and is capable of longitudinal shifting or sliding movement within the casing into and from operative position and into and from operative or driving connection with said section 5, according to whether the grain is to be discharged through opening 4, or opening 3. To permit this longitudinal movement, screw section 11, is in length less than the distance from screw section 5, to the far end wall of the casing, and the shaft 12, of said section 11, is provided with a longitudinal elongated end extension 13, passing through and beyond and mounted to rotate in and slide longitudinally through the journal box 14, of the far end of the casing, and at its opposite end with a longitudinal elongated end extension 15, extending longitudinally through and beyond the hollow shaft 6, 9, of the screw section 5. The end extension 15, is capable of sliding longitudinally within the shaft section 6, 9, and said shaft section is capable of rotating freely on said end extension 15.

The screw section 11, is provided with a notched (or otherwise formed) clutch mechanism 16, rigid therewith and adapted to mesh with clutch member 7, to lock the screw section 11, to rotation with the screw section 5. The clutch member 16, (in the specific example illustrated) is fixed on the inner end of end extension 15, adjacent to the end of shaft 12, and between said clutch member and said shaft end is loosely hung the upper end of radial arm 17, of a normally stationary segmental cut-off valve 18, longitudinally arranged on the floor of the casing and longitudinally movable therein with the screw section 11. The cut-off valve is of a size and formation to close the discharge opening 3, when the screw section 11, is at its limit of movement toward screw section 5, with the clutch members 7, 16, interlocked and the screw section 11, forming a continuation of screw section 5, and across the valve and discharge opening 3. When the parts are in this relation, the grain received through the hopper, will be forced by the screw sections 5, 11, (acting as a single auger or conveyer) throughout the length of the casing to the discharge opening 4.

When it is desired to discharge the grain through opening 3, the screw section 11, through the medium of either shaft end extension 13, 15, is moved longitudinally of the casing toward and across the opening 4, thereby separating the clutch members and throwing section 11, out of driving gear, and moving the valve 18, inwardly of the casing and thereby uncovering the opening 3, and removing the section 11, from operative position between the hopper and the opening 3. When the parts are thus arranged, the grain received through the hopper will drop through opening 3, and the grain dropping into the pocket will be forced therefrom and into opening 3, by the screw section 5. When it is desired to close opening 3, and discharge through opening 4, the section 11, is again forced longitudinally of the casing to its former operative position as shown by Fig. 1, of the drawings.

If so desired, the shaft 12, can be longitudinally hollow and the end extensions 13, 15, formed by straight round metal bars headed at their outer ends and having their inner ends inserted in the shaft ends and fixed by cross pins.

This invention is peculiarly adapted for use in connection with grain separators and threshing machines, but I do not wish to limit my invention to use in such connections nor to employment for handling grain.

It is evident that various changes and variations might be resorted to without departing from the spirit and scope of my invention and hence I do not wish to limit myself to the exact constructions shown.

What I claim is:—

1. In conveyers, a screw conveyer formed in sections, one section thereof being longitudinally movable to and from operative relation with respect to another section thereof.

2. In conveyers, a casing having several discharge openings, means to open and close one of said openings, and a screw conveyer in said casing and formed in sections capable of acting together, one of the sections of said conveyer being movable independently of the other section to an inoperative position with respect thereto.

3. In conveyers, a casing having several spaced discharge openings, a screw conveyer in said casing, said conveyer comprising a longitudinally movable section provided with means for closing and opening one of said discharge openings.

4. In conveyers, a sectional screw conveyer, the shaft of one section being extended and telescoping the other section and means for alternately operatively connecting and disconnecting said sections.

5. In conveyers, a screw conveyer comprising separable sections, the shaft of one section being extended and slidably telescoping the other section, means for applying power to one section, and means for operatively connecting and disconnecting said sections.

6. In conveyers, a casing having several discharge openings, a rotary screw conveyer arranged longitudinally within said casing, means for opening and closing the casing to one of said openings, and means for throwing a portion of said conveyer into and out of operative relation with respect to the remainder of the conveyer.

7. In conveyers, a casing, a screw conveyer comprising separable sections, driving means applied to one of said sections, driving connection between said sections, the other section being independently and longitudinally movable within the casing to establish and break said operative connection, and means for moving said section to and from operative position.

8. In combination, a casing having a top receiving opening and separated bottom discharge openings, a rotary screw conveyer section in said casing having its shaft extending to the exterior of the casing and provided with driving means, a longitudinally movable rotary screw conveyer section in the casing having an end extension longitudinally and slidably extending to the exterior of the casing, a cut-off valve for one of said discharge openings and carried by and longitudinally movable with said last mentioned screw section, and separable clutch means between said sections, whereby the longitudinal movable screw section is rotated from said first mentioned screw section.

9. In conveyers, in combination, a horizontally elongated casing having separated bottom discharge openings, a rotary screw section having a clutch member at its inner end and having its shaft extending to the exterior of the casing and provided with driving means, said screw section being held in the casing against longitudinal movement, a longitudinally movable rotary screw section arranged in the casing in continuation of said first mentioned section and having a clutch member adapted to interlock with said first mentioned clutch member, and provided with shaft end extensions extending longitudinally of the casing to the exterior thereof, and a segmental cut-off valve provided with means hanging the same from said longitudinally movable screw section.

In testimony whereof I affix my signature, in presence of two witnesses.

CHARLES J. HARTLEY.

Witnesses:
E. BLANCHE FITZWATER,
A. J. HARTLEY.